Dec. 11, 1962 W. C. ROBINSON 3,068,403
TEST PROBE
Filed Jan. 27, 1960

INVENTOR
W. C. ROBINSON
BY A. C. Schwary, Jr.
ATTORNEY

United States Patent Office 3,068,403
Patented Dec. 11, 1962

3,068,403
TEST PROBE
William C. Robinson, Columbus, Ohio, assignor to Western Electric Company, Incorporated, New York, N.Y., a corporation of New York
Filed Jan. 27, 1960, Ser. No. 4,968
3 Claims. (Cl. 324—51)

This invention relates to test probes and more particularly to test probes capable of engaging one or a plurality of unskinned insulated conductors and establishing electrical contact therewith.

An object of the invention is to provide an improved test probe.

Another object of the invention is to provide a test probe capable of engaging and establishing electrical contact with unskinned end portions of one or a plurality of insulated conductors.

With these and other objects in view the present invention contemplates the provision of two layers of chain mail or other metal fabric supported on one face and around the edges of a resilient supporting member and mounted therewith on a metal disc and within a slotted peripheral flange thereon to which the marginal portions of the layers of metal fabric are soldered. The metal disc is mounted on an insulated handle and has a conductor connected thereto which is connectible into a testing circuit whereby the test probe may be applied to one or a group of conductors to cause the metal fabric to press back the insulating sheaths from the ends of unskinned conductors and establish electrical connections with one end of the conductors so that the other ends thereof may be individually connected to the testing circuit to test the conductors.

Other objects and advantages of the invention will become apparent by reference to the following detailed description thereof and the accompanying drawings wherein.

Figure 1:
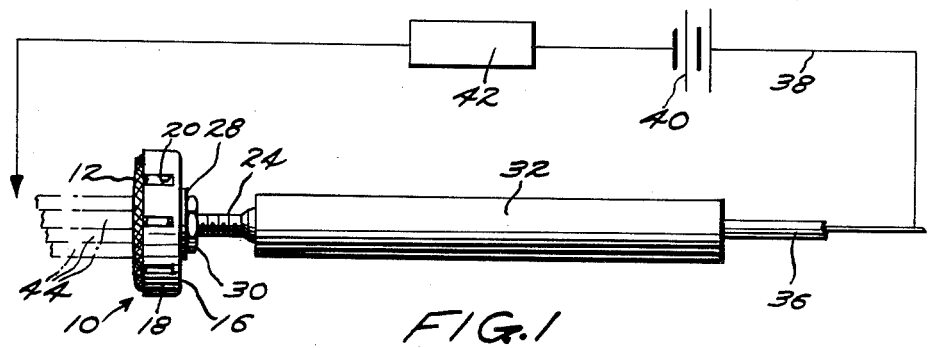
FIG. 1 is a side elevational view of the test probe associated with a simplified testing circuit.
Figure 2:
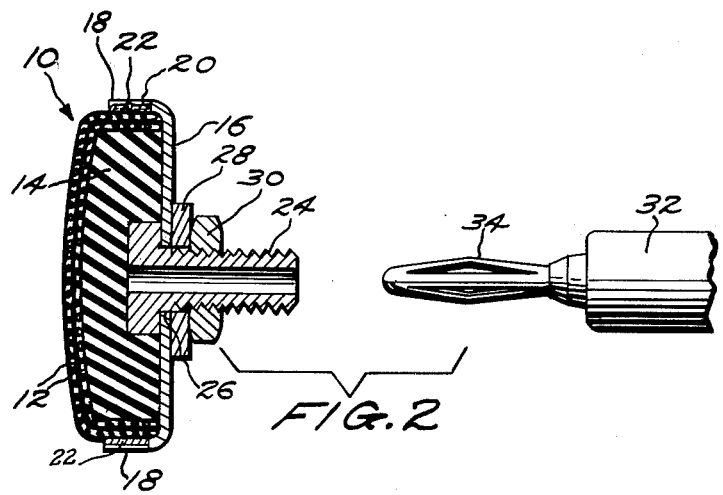
FIG. 2 is an enlarged longitudinal sectional view through the test probe shown in spaced relation to the supporting handle therefor.
Figure 3:
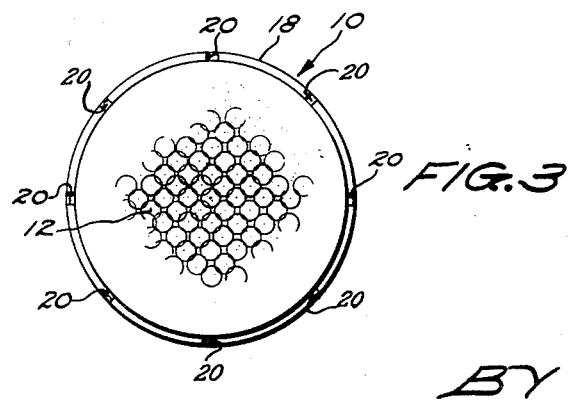
FIG. 3 is an enlarged front view of the test probe.

Referring to the drawings, a test probe, designated generally by the numeral 10, comprises preferably two layers of metal fabric 12 supported on one face and around the edges of a supporting member 14 of resilient material, such as rubber. The metal fabric 12 and the resilient supporting member 14 are mounted on a metal disc 16 within an annular flange 18 thereon which is provided at intervals with slots 20 to permit the application of solder 22 therein for securing the metal fabric 12 to the disc 16 and establishing an electrical connection therewith.

A headed hollow stem 24 extending through a central aperture 26 in the disc 16 is secured to the disc by a washer 28 and a nut 30. A hollow handle 32 of dielectric material is removably connected to the stem 24 by means of a banana type plug 34 which is fixed to the handle and fits within the stem 24. An insulated conductor or lead 36 connected to the plug 34 extends through the handle 32 and may be connected into a testing circuit 38 including a power source 40 and an indicating device, such as a buzzer 42.

When it is necessary or desirable, as for example in the fabrication of electrical equipment using cables, to check the continuity or other characteristics of one or a group of unskinned conductors, the probe 10 may be pressed against the unskinned ends of the conductors 44 indicated in dotted lines in FIG. 1 to cause the metal fabric 12 to engage and press back the sheaths of insulation and allow the ends of the conductors to extend into the recesses and apertures thereof and contact portions of the metal fabric 12 and establish electrical connections between said ends of the conductors 44 and the probe conductor 36. Thereafter the operator may connect the other end of the conductors 44 individually into the test circuit 38 to test the continuity of the conductors.

The rubber supporting member 14 preferably should have a slightly convex outer supporting surface and be of medium density to support firmly the layers of metal fabric 12 against the pressure of the conductors 44.

Although various kinds of flexible reticulated metal fabric 12 may be used, it has been found that chain mail fabric made of interconnected small metal rings is well suited for this type of probe and that, when two layers of such fabric are superposed and used together, it provides an abundance of irregularly arranged surfaces capable of pushing back portions of the insulating sheaths from the ends of the conductors and of contacting the conductors to electrically connect them to the probe.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A test probe for testing insulated conductors having unskinned end portions, which comprises a cup-shaped probe element having a substantially centrally located cavity and a hollow stem extending from the probe element on the side thereof opposite to the cavity, a resilient rubber member positioned within the cavity, a flexible, electrically conductive gauze secured to the probe element in overlying relationship to the resilient member to confine the resilient member within the probe element for providing a resilient support to the gauze, the gauze and the resilient member cooperating with each other for forcing back the insulation of an unskinned end of an insulated conductor being pressed against the gauze and simultaneously providing an electrical connection between the conductor and the gauze, a handle of insulating material having an electrical plug extending from one end thereof and engageable removably in the hollow stem for supporting the probe element, and an electrical lead extending from the electrical plug for connecting the gauze to a testing circuit.

2. A test probe for testing insulated conductors having unskinned end portions, which comprises a cup-shaped probe element having a substantially centrally located cavity and a hollow stem extending from the probe element on the side thereof opposite to the cavity, a resilient rubber member positioned within the cavity, a flexible, electrically conductive chain mail fabric secured to the probe element in overlying relationship to the resilient member so as to confine the resilient member within the probe element for providing a resilient support to the chain mail fabric, the chain mail fabric and the resilient member cooperating in forcing back the insulation of an unskinned end of an insulated conductor being pressed against the chain mail fabric and simultaneously providing an electrical connection between the conductor and the chain mail fabric, a handle of insulating material having an electrical plug extending from one end thereof and engageable removably in the hollow stem for supporting the probe element, and an electrical lead extending from the electrical plug for connecting the chain mail fabric to a testing circuit.

3. A test probe for testing insulated conductors having unskinned end portions, which comprises a cup-shaped probe element having a substantially centrally located cavity and a hollow stem extending from the probe element on the side thereof opposite to the cavity, a resilient rubber member positioned within the cavity, a plurality of superposed layers of flexible, electrically conductive chain mail fabric secured to the probe element in overlying relationship to the resilient member and to each other so as to confine the resilient member within the probe element for providing a resilient support to the chain mail fabric, the superposed layers of the chain mail fabric cooperating with each other and with the resilient member for simultaneously forcing back the insulation of an unskinned end of an insulated conductor being pressed against the chain mail fabric and providing an electrical connection between the conductor and the chain mail fabric, a handle of insulating material having an electrical plug extending from one end thereof and engageable removably in the hollow stem for supporting the probe element, and an electrical lead extending from the electrical plug for connecting the chain mail fabric to a testing circuit.

References Cited in the file of this patent
UNITED STATES PATENTS

| | | |
|---|---|---|
| 1,927,045 | Parsons | Sept. 19, 1933 |
| 2,396,172 | Groven | Mar. 5, 1946 |
| 2,663,844 | Earle et al. | Dec. 22, 1953 |